US005118375A

United States Patent [19]

Malachowski et al.

[11] Patent Number: 5,118,375

[45] Date of Patent: Jun. 2, 1992

[54] METHOD AND APPARATUS FOR MAKING ENVELOPES ON-LINE FOR DIRECT MAIL APPLICATION

[75] Inventors: Michael A. Malachowski, Webster; William R. Burger, Fairport, both of N.Y.

[73] Assignee: Xerox Corporation, Stamford, Conn.

[21] Appl. No.: 564,559

[22] Filed: Aug. 9, 1990

[51] Int. Cl.[5] .................. B43M 3/04; B43M 5/00; B32B 3/02

[52] U.S. Cl. .................. 156/216; 156/217; 156/277; 156/442.1; 156/443; 156/479; 53/284.3; 270/4

[58] Field of Search .................. 156/442.1, 441.5, 540, 156/542, 489, 216, 217, 277, 227, 443, 479, 442.2; 53/206, 284.3; 270/1.1, 4, 37, 57; 493/260, 917; 283/116

[56] References Cited

U.S. PATENT DOCUMENTS

| | | | |
|---|---|---|---|
| 2,346,142 | 4/1944 | Anderson . | |
| 3,260,516 | 7/1966 | Blair | 270/37 X |
| 3,303,080 | 2/1967 | Aguilera | 156/216 |
| 3,841,936 | 10/1974 | Fergg et al. | 156/216 |
| 3,845,698 | 11/1974 | Scholle . | |
| 3,983,679 | 10/1976 | Zemke | 53/284.3 |
| 4,031,818 | 6/1977 | Kehoe . | |
| 4,033,807 | 7/1977 | Neill et al. | 156/442.1 X |
| 4,312,169 | 1/1982 | Golicz et al. . | |
| 4,329,191 | 5/1982 | Barber | 156/216 X |
| 4,520,055 | 5/1985 | Jeter | 156/216 X |
| 4,523,776 | 6/1985 | Barber | 156/216 X |
| 4,530,730 | 7/1985 | Bradley et al. . | |
| 4,530,731 | 7/1985 | Bradley . | |
| 4,552,497 | 11/1985 | Kockler et al. | 270/37 X |
| 4,588,463 | 5/1986 | Barber et al. | 156/216 X |
| 4,596,620 | 6/1986 | Karolyi | 156/489 X |
| 4,690,392 | 9/1987 | Coons, Jr. . | |
| 4,733,856 | 3/1988 | Gunther et al. | 53/284.3 |
| 4,900,391 | 2/1990 | Mandel et al. . | |

FOREIGN PATENT DOCUMENTS

| | | | |
|---|---|---|---|
| 806513 | 2/1969 | Canada | 156/441.5 |

*Primary Examiner*—Jeff H. Aftergut
*Attorney, Agent, or Firm*—Oliff & Berridge

[57] ABSTRACT

Apparatus is provided for forming an envelope capable of containing sheet material therein having a width equal to the width of the envelope by performing the steps of: feeding a sheet having a width and a length from a tray in a predetermined direction; folding the sheet across its width into a single fold to form first and second flaps, each flap having a width equal to the width of the sheet; pressing the first and second flaps together; and applying an adhesive tape over ends of the sheet to secure the first and second flaps together to form an envelope having an internal width at least the same as the width of the sheet, the adhesive tape completely forming the ends of the envelope. An insert sheet can be folded and placed between the first and second flaps prior to pressing the flaps together and, when a portion of the second flap which extends beyond the first flap is folded over the first flap prior to applying the adhesive tape thereto, the application of the adhesive tape will completely seal the insert material within the envelope so that the sealed envelope will be outputted "ready-to-mail".

38 Claims, 3 Drawing Sheets

METHOD AND APPARATUS FOR MAKING ENVELOPES ON-LINE FOR DIRECT MAIL APPLICATION

BACKGROUND OF THE INVENTION

1. Field of the Invention

The present invention is directed to methods and apparatus for folding and inserting letters into envelopes for mailing, and in particular to methods and apparatus of this type which are capable of operating "on line" with a printer or copier.

2. Description of Related Art

The flexibility and speed of present electronic printers make them ideal for use in a variety of billing and advertising "direct mail" applications.

Some "off-line" devices have been made which take electronically printed sheets (with the address printed on one side and the bill printed on the other) and fold and seal them to form envelopes as shown in FIG. 1. This yields a single sheet ready to mail output. Folding systems also exist which can nest other items into the sheet being folded.

For example, U.S. Pat. Nos. 3,265,382 and 3,416,785 disclose paper nesting on envelope apparatuses. Both patents disclose means, provided for producing a first fold of a sheet and for nesting a second folded sheet within the folded portions of the first sheet. Means are further provided to affect a second folding of the first sheet whereby the second sheet is completely enveloped within the first sheet. U.S. Pat. No. 3,242,637 is directed to a sheet folding and inserting apparatus wherein sheets and envelopes are fed in timed relation so that the sheet can be folded and inserted into the envelope. An envelope feeding mechanism includes a reciprocating rack which is cam actuated to feed an envelope at a prior time. In U.S. Pat. No. 4,031,818 an apparatus for preparing sealed envelope units with messages is disclosed and in FIG. 1 shows a folding station for folded envelope blanks. An adhesive application station is provided as shown in FIG. 1.

U.S. Pat. No. 2,346,142 to Anderson discloses an automatic pressure-sensitive adhesive tape dispenser which measures lengths of pressure-sensitive adhesive tape supplied from a reel. Rollers are provided so that one or both serve as a sealing means to press tape against a top and/or bottom of an object.

U.S. Pat. No. 4,312,169 to Golicz et al discloses a mechanism for making an envelope around an insert. First and second conveyors move the envelope past folding mechanisms and further past a suitable adhesive applicator. The machine may operate with a previously separated letter assembly and envelope assembly.

U.S. Pat. No. 3,845,698 to Scholle discloses a method for making an envelope containing a separate enclosure sheet, wherein the letter sheet and envelope may be automatically folded, separated and assembled with the detached letter inside the formed envelope. A composite sheet consisting of an envelope-enclosure unit is fed to an automatic folding and sealing machine, the enclosure is folded about itself and the line joining the enclosure to the envelope into an overlying engagement with a portion of the envelope and secured by means of glue spots. The enclosure is then separated from the envelope, and the envelope is folded and sealed about the enclosure.

U.S. Pat. No. 4,530,730 to Bradley et al and U.S. Pat. No. 4,530,731 to Bradley disclose methods for making envelope assemblies with at least one separate enclosure from the same web of sheet material which is contour cut before folding and scoring. A fugitive glue is applied behind the scoreline, and the enclosure portion of the web is folded over the envelope portion. The mailing assembly is formed by scoring and folding the flaps.

None of the above-mentioned patents disclose an "on-line" system which can take electronically printed sheets, bills or advertisements, fold them and then put them into other printed sheets that have been folded to form envelopes. Additionally, none of these patents disclose methods or apparatus for forming envelopes from sheets which are the same size as the letter (or enclosure) sheets without requiring trimming of at least the edges of the letter sheet so that the letter will fit within the width of the envelope sheet. This trimming is required because the envelope is usually formed by gluing opposed edges of a once-folded sheet to each other. This method for forming the envelopes results in an envelope which has an internal space which is less than the width of the sheet used to form the envelope. Therefore, letters or other material inserted into the envelope must also have a width which is less than the width of the sheet used to form the envelope.

U.S. Pat. No. 4,900,391 to Mandel et al, the disclosure of which is herein incorporated by reference, discloses a sheet recirculating, folding and gluing system which folds documents, holds them at a wait station, and then inserts them into another sheet which is folded and glued "on-line" to form an envelope. The sheet used to form the envelope is larger than or the same size as the sheet which is folded and inserted therein (e.g., a letter). When the envelope sheet is the same size as the inserted sheets, the sides of the inserted sheet(s) must be trimmed using a slitter or the envelope sheet must be arranged with its longitudinal axis perpendicular to the longitudinal axis of the inserted sheet(s) prior to folding.

It is desirable to provide an "on-line" envelope forming and insertion system which is capable of using "same size" sheets to form the envelope and the inserts which does not require trimming or rotation of the sheets. Such a system would require less components (no slitter or rotator) and could also be made more compact since it would only have to handle sheets which were inserted short edge first (the paper handling system must be made wider for handling sheets fed long edge first). It is also desirable to provide a system which adhesively closes the ends of an envelope after all folding and inserting is completed so that the other components of the system do not become fouled with adhesive.

The disclosed apparatus may be readily operated and controlled in a conventional manner with conventional control systems. Some additional examples of control systems for various prior art copiers with document handlers, including sheet detecting switches, sensors, etc., are disclosed in U.S. Pat. Nos. 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in general, and preferable, to program and execute such control functions and logic with conventional software instructions for conventional microprocessors. This is taught by the above and other patents and various commercial copiers. Such software will of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hardwired logic or switching systems.

All references cited in this specification, and their references, are incorporated by reference herein where appropriate for appropriate teachings of additional or alternative details, features, and/or technical background.

OBJECTS AND SUMMARY OF THE INVENTION

It is an object of the present invention to provide a method and apparatus for forming and filling envelopes "on-line" with a printer or copier.

It is another object of the present invention to provide a method and apparatus for forming and filling envelopes from same size sheets without requiring trimming or extra rotation of any of the sheets.

It is another object of the present invention to provide a method and apparatus for forming and filling envelopes which results in a "ready to mail" output.

It is a further object of the present invention to provide a method and apparatus for forming and filling envelopes which does not apply adhesive to any of the sheets until after all folding and inserting is complete.

To achieve the foregoing and other objects, and to overcome the shortcomings discussed above, a method and apparatus for creating envelopes on-line for the insertion of a same size sheet material therein is disclosed. Apparatus is provided for forming an envelope capable of containing sheet material therein having a width equal to the width of the envelope by performing the steps of: feeding a sheet having a width and a length from a tray in a predetermined direction; folding the sheet across its width into a single fold to form first and second flaps, each flap having a width equal to the width of the sheet; pressing the first and second flaps together; and applying an adhesive tape over ends of the sheet to secure the first and second flaps together to form an envelope having an internal width at least the same as the width of the sheet, the adhesive tape completely forming the ends of the envelope. An insert sheet can be folded and placed between the first and second flaps prior to pressing the flaps together and, when a portion of the second flap which extends beyond the first flap is folded over the first flap prior to applying the adhesive tape thereto, the application of the adhesive tape will completely seal the insert material within the envelope so that the sealed envelope will be outputted "ready-to-mail".

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
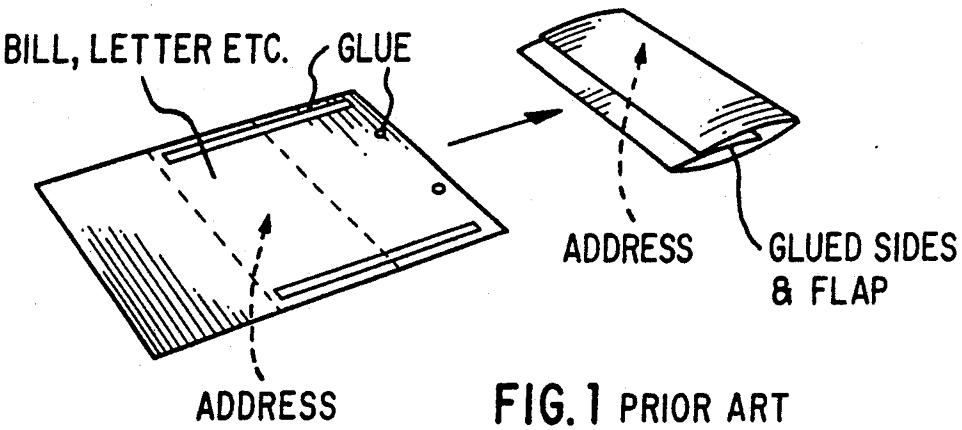
FIG. 1 PRIOR ART
FIG. 1 is a schematic representation of existing single sheet output technology now being done on "off-line" systems.
Figure 2:
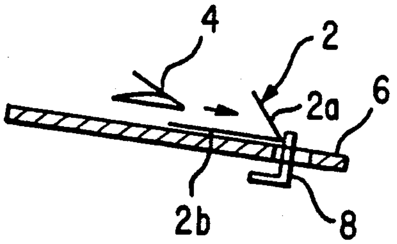
FIG. 2 is a side view of a twice-folded insert sheet being placed into a once-folded envelope sheet resting against a registration gate according to the present invention.

FIG. 2 is a side view of an insert material 4 being placed within a once-folded envelope sheet 2 according to one step of the present invention. Prior to placement of insert material 4 therein, but after a single fold is placed in envelope sheet 2 to form first and second flaps 2*a*, 2*b*, it is delivered to a compiler tray 6 and comes to rest against a registration gate 8. Registration gate 8 can be moved below the surface of compiler tray 6 after insert material 4 is placed in envelope sheet 2 and the ends of the envelope sheet 2 are formed in accordance with the present invention to output a ready-to-mail envelope.

Figure 3A:
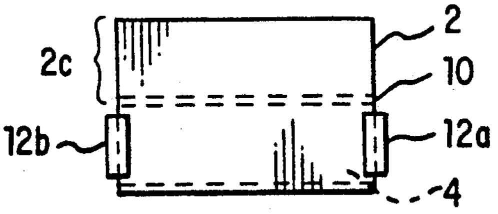
FIG. 3A is a plan view of an envelope having an insert material placed therein after adhesive tape is secured to end portions thereof to form ends of the envelope.
Figure 3B:
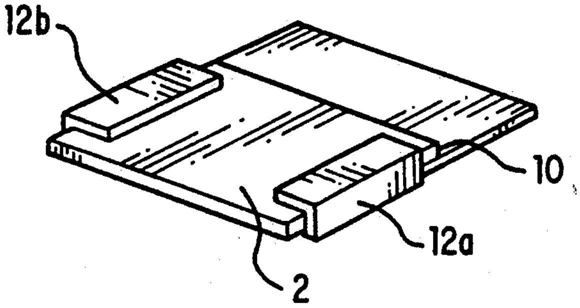
FIG. 3B is a schematic isometric view of the envelope shown in FIG. 3A.

FIGS. 3A and 3B are plan and schematic views, respectively, of envelope sheet 2 containing insert material 4 after adhesive tape 12*a*, 12*b* is placed over ends of envelope sheet 2 to secure flaps 2*a* and 2*b* together. Envelope sheet 2 can be folded so that second flap 2*b* has a length which is greater than the length of first flap 2*a* so that an extension 2*e* of second flap 2*b* extends beyond first flap 2*a*. Envelope sheet 2 can be folded (along a line indicated by broken line 10) to place extension 2*e* in contact with first flap 2*a* to completely close the envelope. If extension 2*e* is folded over flap 2*a* prior to placement of adhesive tapes 12*a*, 12*b* on ends of the envelope, extension 2*e* will also be secured so that the entire envelope can be sealed with the use of only adhesive tapes 12*a*, 12*b*. Alternatively, adhesive can be applied to an end portion of extension 2*e* and extension 2*e* can be folded to contact flap 2*a* and adhesively secured thereto after placement of adhesive tapes 12*a*, 12*b* over ends of first and second flaps 2*a*, 2*b*. An advantage of folding extension 2*e* prior to placement of adhesive tapes 12*a*, 12*b* is that no adhesives in addition to tapes 12*a*, 12*b* will be required to form the sealed envelope containing insert material 4.

A number of advantages are achieved by forming an envelope according to the present invention. Since the envelope has an internal width which is at least as large as the width of the sheet 2 used to form the envelope, same size sheets can be inserted into the envelope without requiring any trimming of the inserts. Additionally, unlike the system disclosed in the above-mentioned U.S. Pat. No. 4,900,391, the envelope sheet 2 is not rotated any differently from the insert material sheet 4 and thus enters the folding apparatus short edge first just like the sheets which make up the insert material. Thus the total width of the device need only be as wide as the length of the short edge of the largest sheet to be used as an insert material. Furthermore, the control of the upstream printer or copier can be simplified because different sized sheets do not have to be alternately fed and because all sheets will be similarly rotated (rotation may be required between the output of the printer or copier and the input of the envelope maker if the printer or copier outputs sheets long edge first). This simplification in control can result in higher operating speeds and thus increased output per unit time.

Figure 4:
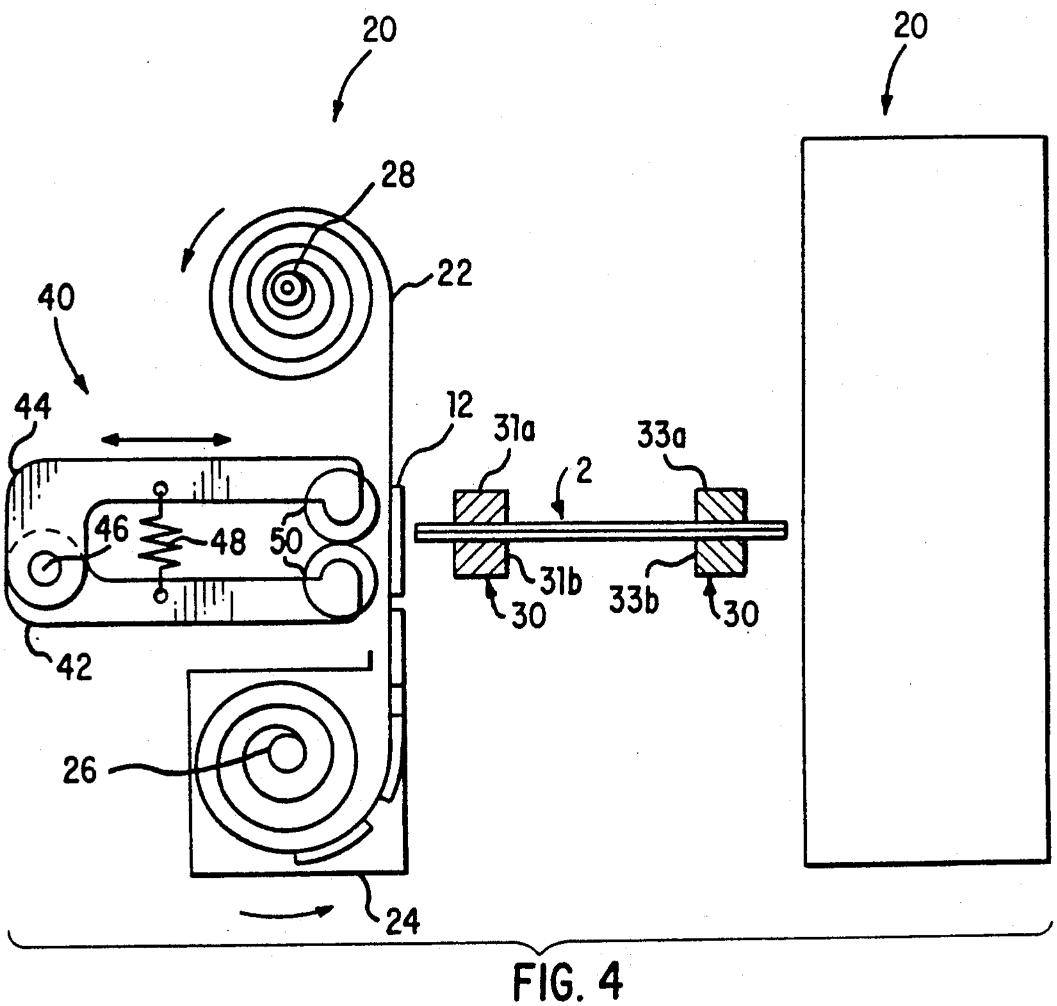
FIG. 4 is a schematic side view of an apparatus for applying adhesive tape over ends of a once-folded envelope sheet to secure the first and second flaps thereof together.

FIG. 4 is a schematic side view of an apparatus 20 for applying adhesive tapes 12 to the first and second flaps of envelope sheet 2 to form the ends of the envelope. A sheet is fed in a predetermined direction from a tray which can be, for example, the output tray of a printer of copier, the sheet having a width and length. The sheet is folded once across its width to form first and second flaps 2*a*, 2*b*, each flap having a width equal to the width of the sheet. Preferably an insert material 4 is placed between the first and second flaps 2*a*, 2*b* prior to the application of adhesive tapes 12*a*, 12*b* thereto, although the envelope can be formed without the prior placement of insert material 4 therein. After sheet 2 is folded to form flaps 2*a* and 2*b*, the first and second flaps are pressed together using, for example, clamps 30. Clamp 30 can include, for example, first and second pairs of jaws 31*a,b* and 33*a,b*, spaced apart from each other to selectively engage respective end portions of envelope sheet 2. Although a single large pair of jaws can be used, the illustrated arrangement permits more fragile or bulky insert materials (e.g., samples) to be inserted into the envelope. The clamping and application of tapes 12*a*, 12*b* can be conducted, for example, while the folded envelope sheet is located in the compiler tray 6 of FIG. 2. A tape applying apparatus 20 is then used to apply adhesive tape over each end of the pressed flaps to form ends of the envelope. Only one tape applying apparatus 20 is illustrated in FIG. 4, however, it is noted that an additional apparatus which is the mirror image of the apparatus shown in FIG. 4 would be used to apply adhesive tape to the other one of the pressed flaps 2*a*, 2*b*.

Tape applying apparatus includes an elongated tape carrier or web 22 which includes a plurality of pieces of adhesive tape 12 spacedly arranged thereon. The pieces of adhesive tape can be, for example, pressure sensitive label stock. The label stock 12 includes adhesive on most of the surface facing the folded sheet 2, however the center portion preferably is free of adhesive so that the adhesive will not adhere to edges of the insert material contained within envelope sheet 2. The tape carrier 22 can be provided in roll form in a cassette 24. The tape carrier 22 is wrapped around a supply spool 26, the lead end thereof being secured to a take-up spool 28. As each envelope sheet is placed in position for the application of adhesive tape thereto, the take up spool 28 can be rotated so that a new piece of adhesive tape 12 is located adjacent each end of the folded envelope sheet 2. An applicator 40 is then actuated to apply the tape 12 over the end of the folded envelope sheet 2. Applicator 40 includes first and second arms 42, 44 which are pivotally attached to each other at pivot point 46. Each of arms 42, 44 includes a roller 50 at an end thereof opposite from pivot point 46. The rollers 50 are arranged so that their peripheral surfaces contact each other. First and second arms 42, 44 are biased towards each other by spring 48 so that rollers 50 are pressed against one another. When it is desired to apply adhesive label 12 to the folded envelope sheet 2, arms 42, 44 are moved toward the envelope as indicated by the double arrowed line to apply tape 12 to first and second flaps 2*a*, 2*b*.

Figure 5A:
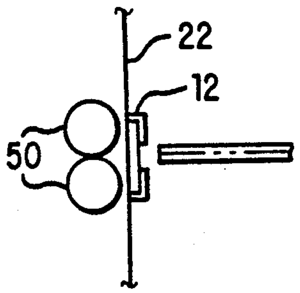
FIGS. 5A–5C illustrate sequential steps of applying adhesive tape to one end of an envelope.
Figure 5B:
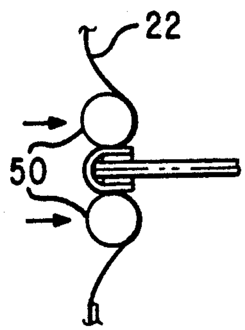
Figure 5C:
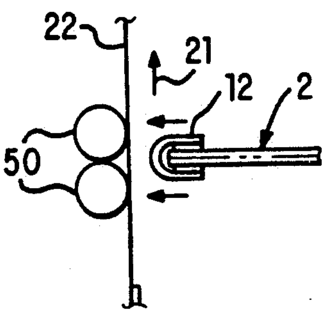

The tape applying device 20 incrementally moves through three positions shown in FIGS. 5*a*–5*c*. In the first position, illustrated in FIG. 5*a*, also known as the "ready" position, the flaps 2*a*, 2*b* of an envelope sheet 2 are pressed together and located adjacent an adhesive tape or label 12. In the second step, illustrated in FIG. 5B, also known as the "applying" step, applicator 40 is moved towards envelope sheet 2 and the label or tape 12 is applied over the ends of the sheet 2 to secure the first and second flaps 2*a*, 2*b* together to form an envelope having an internal width at least the same as the width of the sheet 2. The adhesive tape 12 actually forms the ends of the envelope. The width of the envelope may be made larger than the width of the envelope sheet by attaching tapes 12*a*, 12*b* to flaps 2*a*, 2*b* so that a space is provided between the tapes 12*a*, 12*b* and the end edges of flaps 2*a*, 2*b*. FIG. 5C illustrates the third position of tape applying apparatus 20 wherein applicator 40 is retracted away from the envelope and the tape carrier 22 is incremented forward as indicated by arrow 21 to place the next label or tape 12 in position for being applied to the next folded envelope sheet 2. Torsion springs can be provided on supply spool 26 and take-up spool 28 so that the tape carrier 22 will be able to move with the label applicator 40 as shown in FIG. 5B without damaging tape carrier 22.

Figure 6:
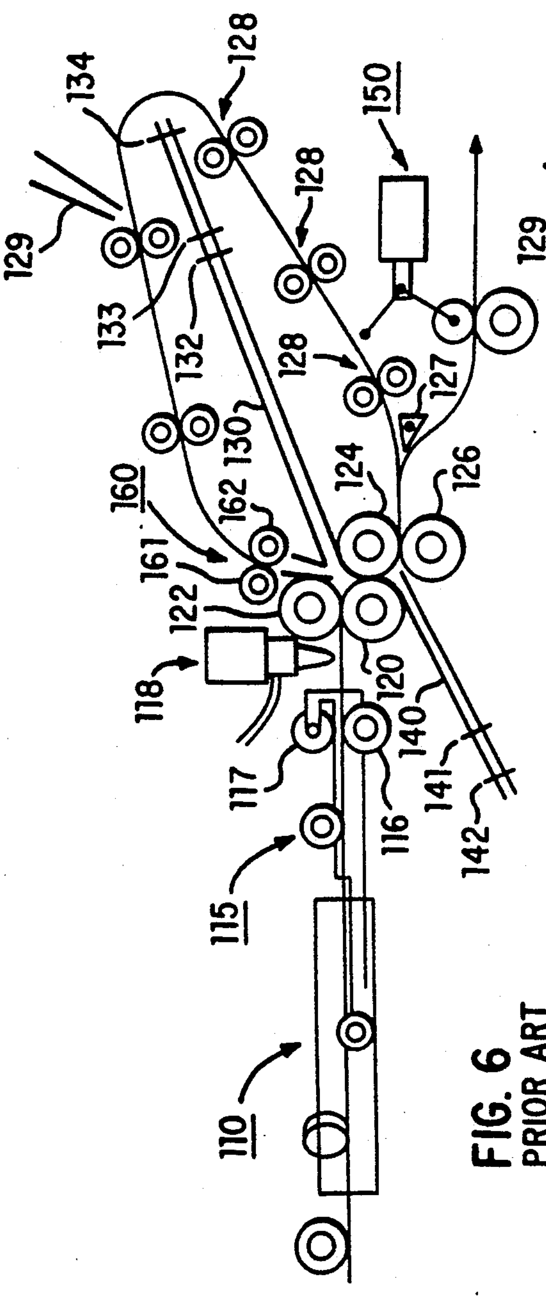
FIG. 6 PRIOR ART
FIG. 6 is a schematic side view of a prior art recirculating folder direct mail system.

The present invention can be incorporated into any number of existing devices for folding and inserting sheets into one another. For purposes of illustration, the recirculating folder described in U.S. Pat. No. 4,900,391 will be described and modified to include the envelope forming device of the present invention. FIG. 6 is a schematic side view of the recirculating folder for direct mail application disclosed in the above-incorporated U.S. Pat. No. 4,900,391. The "on-line" recirculating folder apparatus includes a conventional sheet turning station 110 which accepts sheets from a conventional printer or copier (not shown) with the long edge as the lead edge and turns the sheet so that its lead edge will be its short edge. That is, for an $8\frac{1}{2}\times 11''$ sheet, the lead edge will exit the printer or copier with the 11" edge of the sheet as the lead edge and the sheet is turned in a conventional manner until the $8\frac{1}{2}''$ edge is the lead edge. Sheets entering the folding apparatus are compiled in a conventional compiler 115 and fed individually therefrom by feed rolls 116 and 117 short edge first to drive roll 120 that cooperates with idler roll 122 to drive each sheet into first fold plate 130 and against first folding gate 132. Continued driving of the sheet by drive roll 120 causes the sheet to be forced into a nip formed between drive roll 120 and idler roll 124 creating a first fold in the sheet and into a second folding chamber 140 against folding gate 141. As drive roll 120 continues to rotate, the sheet is driven by drive roll 120 into a nip formed by drive roll 126 and idler roll 124 thereby placing a second fold in the sheet. The now twice folded sheet is then forwarded past deflector 127 that is in its down or home position which allows the sheet to be transported by transport nips 128 past an insertion station 129 to pre-nesting station 160 that includes conventionally clutched or servo driven rolls 161 and 162 to ensure precise timing of the nesting/insertion operation. Fold chambers 130 and 140 include additional fold gates 133, 134 and 142, respectively, for use with different sized sheets or to vary the locations of folds placed in the sheets as is well known in the art.

Meanwhile, an 8½×11" sheet printed with the address information is being fed into the folder apparatus. Before it enters the nip formed between rolls 120 and 122, an adhesive is applied by glue pens of a conventional gluing means 118 to the sides of the sheet in a manner similar to that used in single sheet applications. The now adhesive containing sheet is transported by the drive roll 120 and a first fold is placed therein as described herein before. During this operation, clutched rolls 161 and 162 are actuated and the pre-nested, twice folded sheet is forwarded and nested into the first fold of the sheet containing the adhesive. Once the twice folded sheet is nested in the address carrying sheet, a second fold is placed in the sheet as described herein before and the now sealed envelope is forwarded by drive roll 126 past deflector 127 which has been actuated into its raised position to allow the envelopes to be driven toward an output device or stacker (not shown). If desired, solenoid actuated perforators 150 could be used to perforate the edges of the envelope for easy opening. Depending on the required printing or copying rate, it may be necessary to print or copy and fold two 8"×10" contents and then two 8½"×11" envelopes, to give the contents time to recirculate.

As described earlier, if it is desired to use the same size sheet to form the envelope as the inserted material, the sheet used to form the insert material is trimmed by a trimmer (shown in FIG. 3 of the U.S. Pat. No. 4,900,391) so that the width of the inserted material will be less than the width of the envelope. Alternatively, the sheet used to form the envelope is not rotated by rotator 110 and thus enters the folding mechanism long edge first. This requires the feed path to be at least 11" wide, or if 11"×17" sheets are used, 17" wide to accommodate sheets fed long edge first.

Figure 7:
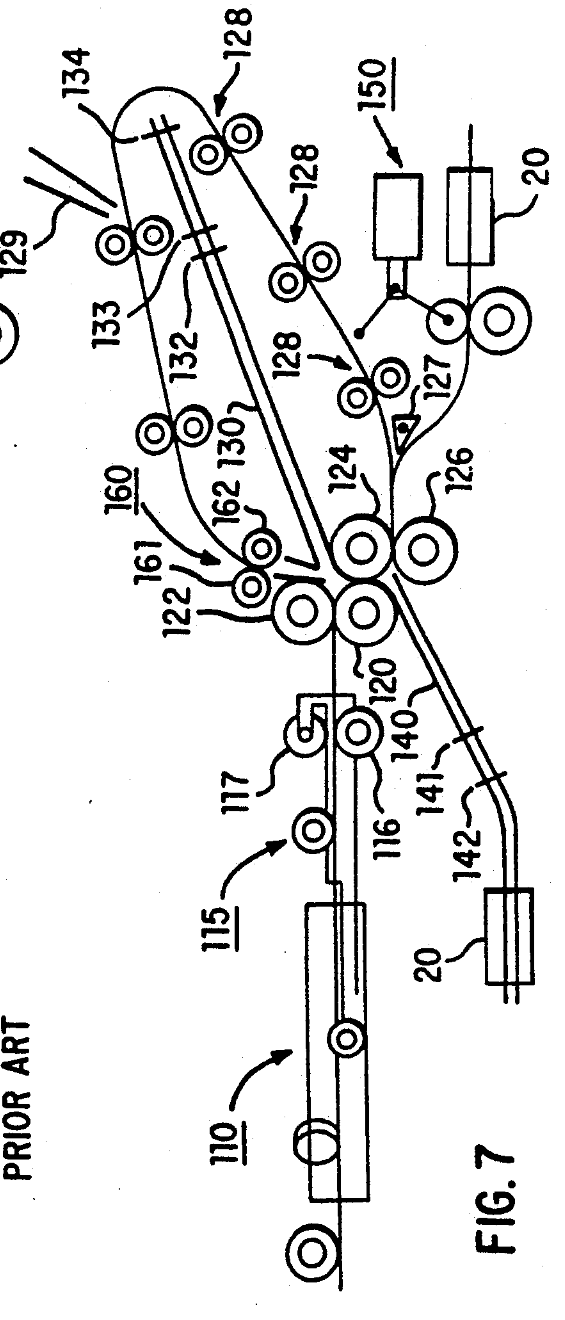
FIG. 7 is a schematic side view of the recirculating folder direct mail system of FIG. 6 modified to include the on-line envelope maker according to the present invention.

FIG. 7 shows a recirculating folder which includes the envelope forming apparatus 20 according to the present invention. The apparatus illustrated in FIG. 7 functions in a manner similar to that described above with respect to FIG. 6 however the envelope sheet will not have adhesive applied thereto by ink pen 118 prior to being folded. This is advantageous in that the arrangement shown in FIG. 6 can foul the rollers 120-124 as well as the fold chambers 130, 140 with glue if the glue does not dry totally prior to being inserted between the rollers or into the fold chamber. After the insert material is placed into the envelope sheet and the envelope sheet is folded once by rollers 120 and 124, gates 141, 142 are moved out of folding chamber 140 so that the envelope containing the insert material therein will pass to envelope forming apparatus 20. While in apparatus 20, the folded envelope sheet containing insert material is conveyed to a compiler tray, such as shown in FIG. 2 and then adhesive tapes 12 are placed on ends of the folded envelope sheet to form ends of the envelope. Such an arrangement would result in the output of envelopes containing insert material but having extension 2e in the open position. Extension 2e would then be adhesively attached to flap 2a by conventional procedures. Alternatively, after placement of the insert material into envelope sheet 2 and passage of envelope sheet 2 through rollers 120 and 124 and into chamber 140, the envelope and insert material contained therein can be conveyed out of chamber 140 by roller 124, 126 as in the FIG. 6 embodiment to place extension 2e in contact with first flap 2a. The twice folded envelope sheet containing insert material 4 is then deflected by deflector 127 which has been actuated into its raised position to allow the envelope to be directed to envelope forming apparatus 120 which places adhesive tapes 12a, 12b over ends of the envelope sheet to secure the first and second flaps 2a, 2b together as well as the extension 2e to the first flap 2a and form an entirely sealed ready-to-mail envelope.

While the present invention is described with reference to the recirculating folder described in U.S. Pat. No. 4,900,391, this particular embodiment is intended to illustrative, not limiting. For example, other apparatus can be used to place folds in the envelope and insert material sheets such as, for example, the folding apparatus disclosed in allowed U.S. patent application Ser. No. 07/560,812, now U.S. Pat. No. 5,076,556 entitled "Compact, single Fold Plate, Bi-Roll Folder With Z-Fold Capability", to Barry Mandel, filed on Jul. 31, 1990 and assigned to the same assignee as the present invention. Various modifications may be made without departing from the spirit and scope of the invention as defined in the appended claims.

What is claimed is:

1. A method of forming and filling envelopes on-line with a printing apparatus by using an apparatus for folding and filling envelopes connected directly to the output of the printing apparatus, comprising:

(a) alternately feeding insert sheets and envelope sheets which are of the same size, and thus have the same width and length, from the same sheet feed tray of the printing apparatus;

(b) alternately forming inert information on the insert sheets and address information on the envelope sheets with the printing apparatus;

(c) folding the envelop sheet across its width in a single fold to form first and second opposed flaps, each flap having a width equal to the width of said envelope sheet and having first and second ends respectively, located at opposite edges along the width of said envelop sheet to form an envelope;

(d) folding and inserting the insert sheet into the envelope sheet; and (e) sealing the envelope sheet to form a ready-to-mail envelope containing insert material by:

(i) pressing the first and second flaps together so that the first end of said first flap opposes the first end of said second flap and the second end of said first flap opposes the second end of said second flap; and (ii) applying adhesive tape over the first and second ends of the first and second flaps to secure the first end of the first flap to the first end of the second flap, and to secure the second end of the first flap to the second end of the second flap to form an envelope having an internal width at least the same as the width of the envelope sheet, the adhesive tape forming first and second opposite ends of the envelope, wherein the insert sheets and envelope sheets are fed through the printing apparatus and the apparatus for folding and filling envelopes in the same orientation and without having their sizes altered.

2. The method according to claim 1, wherein said second flap has a length greater than a length of said first flap to form an extension which extends beyond said first flap.

3. The method according to claim 2 further comprising:

folding said extension over said first flap prior to applying said adhesive tape so that said adhesive tape also secures said extension to said first flap when applied, in addition to forming said first and second opposite ends of the envelope 4. The method according to claim 2, further comprising:

folding said extension over said first flap after said adhesive tape is applied, and adhesively securing said extension to said first flap.

5. The method according to claim 1 wherein said printing apparatus is a copier.

6. The method according to claim 1 wherein said printing apparatus is a printer.

7. A method of forming envelopes capable of having a seam size sheet material inserted therein, comprising:

(a) feeding an envelope sheet having a width and a length from a tray in a predetermined direction;

(b) folding the envelope sheet across its width in a single fold to form first and second opposed flaps, each flap having a width equal to the width of the envelope sheet and having first and second ends respectively, located at opposite edges along the width of the envelope sheet;

(c) pressing the first and second flaps together so that the first end of said first flap opposes the first end of said second flap and the second end of said first flap opposes the second end of said second flap; and (d) applying adhesive tape over the first and second ends of the first and second flaps to secure the first end of the first flap to the first end of the second flap, and to secure the second end of the first flap to the second end of the second flap to form an envelope having an internal width at least the seam as the width of the envelope sheet, said adhesive tape forming first and second opposite ends of said envelope.

8. The method according to claim 7, further comprising:

placing a folded insert sheet between said first and second flaps prior to pressing said flaps together.

9. The method according to claim 8, wherein said second flap has a length greater than a length of said first flap to form an extension which extends beyond said first flap.

10. The method according to claim 9 further comprising:

folding said extension over said first flap prior to applying said adhesive tape so that said adhesive tape also secures said extension to said first flap when applied, in addition to forming said first and second opposite ends of the envelope.

11. The method according to claim 9, further comprising:

folding said extension over said first flap after said adhesive tape is applied, and adhesively securing said extension to said first flap.

12. The method according to claim 8, wherein said insert sheet has a width equal to the width of the envelope sheet.

13. The method according to claim 8, wherein said insert sheet is the same size as said envelope sheet, said insert sheet being folded at least twice prior to being placed between said first and second flaps.

14. The method according to claim 4, wherein said tray is an output tray of a copier and thus said envelope sheet is fed directly from an output of said copier.

15. The method according to claim 7, wherein said tray is an output tray of a printer and thus said envelope sheet is fed directly from an output of said printer.

16. The method according to claim 7, wherein the width of said envelope sheet is less than the length thereof so that said envelope sheet has two parallel short edges and two parallel long edges which are perpendicular to said short edges, said envelope sheet being fed in said predetermined direction short edge first.

17. A method of forming envelopes on-line with a printing apparatus which prints text onto envelope forming sheets and sheets to be inserted into the envelopes, comprising:

(a) placing a once-folded envelope sheet on a support, said envelope sheet having a length and a width and having been previously folded along its width to form first and second opposed flaps, each flap having a width equal to the width of said envelope sheet and having first and second ends respectively, located at opposite edges along the width of said envelope sheet;

(b) pressing the first and second flaps together so that the first end of said first flap opposes the first end of said second flap and the second end of said first flap opposes the second end of said second flap; and (c) applying adhesive tape over the first and second ends of the first and second flaps to secure the first end of the first flap to the first end of the second flap, and to secure the second end of the first flap to the second end of the second flap to form an envelope having an internal width at least the same as the width of the envelope sheet, said adhesive tape forming first and second opposite ends of the envelope.

18. The method according to claim 17, further comprising:

placing a folded insert sheet between said first and second flaps prior to pressing said flaps together.

19. The method according to claim 18, wherein said insert sheet has a width equal to the width of the envelope sheet.

20. The method according to claim 19, wherein said insert sheet and said envelope sheet are of the same size, and are fed through the printing apparats and placed onto said support while in a same orientation, and without having their respective sizes altered.

21. The method according to claim 18, wherein said insert sheet is the same size as said envelope sheet, said insert sheet having been folded at least twice prior to being placed between said first and second flaps.

22. The method according to claim 18, wherein said second flap has a length greater than a length of said first flap to form an extension which extends beyond said first flap; further comprising:

folding said extension over said first flap prior to applying said adhesive tape so that said adhesive tape also secures said extension to said first flap when applied, in addition to forming the first and second opposite ends of the envelope.

23. The method according to claim 19, wherein said second flap has a length greater than a length of said first flap to form an extension which extends beyond said first flap; further comprising:

folding said extension over said first flap after said adhesive tape is applied, and adhesively securing said extension to said first flap.

24. Apparatus for forming envelopes capable of having a same size sheet material inserted therein, comprising:

means for feeding an envelope sheet having a width and a length from a tray in a predetermined direction;

means for folding the envelope sheet across its width in a single fold to form first and second opposed flaps, each flap having a width equal to the width of the envelope sheet and having first and second ends respectively, located at opposite edges along the width of said envelope sheet;

means for pressing the first and second flaps together so that the first end of said first flap opposes the first end of said second flap and the second end of said first flap opposes the second end of said second flap; and means for applying adhesive tape over the first and second ends of the first and second flaps to secure the first end of the first flap to the first end of the second flap, and to secure the second end of the first flap to the second end of the second flap to form an envelope having an internal width at least the same as the width of the envelope sheet, said adhesive tape forming first and second opposite ends of said envelope.

25. The apparatus according to claim 24, further comprising:

means for placing a folded insert sheet between the first and second flaps prior to the flaps being pressed together by said means for pressing.

26. The apparatus according to claim 25, wherein said means for folding folds the envelope sheet across its width so that the second flap has a length which is greater than a length of the first flap to form an extension which extends beyond the first flap.

27. The apparatus according to claim 26, further comprising:

means for folding the extension over the first flap prior to applying the adhesive tape so that the adhesive tape also secures the extension to the first flap when applied by said means for applying, in addition to forming the first and second opposite ends of the envelope.

28. The apparatus according to claim 26, further comprising:

means for folding the extension over the flap after the adhesive tape is applied by said means for applying; and means for adhesively securing the extension to the first flap.

29. The apparatus according to claim 25, wherein said insert sheet has a width equal to the width of the envelope sheet, and further comprising means for folding the insert sheet at least once prior to being placed between the first and second flaps.

30. The apparatus according to claim 25, wherein said insert sheet is the same size as said envelope sheet, and further comprising means for folding the insert sheet at least twice prior to being placed between the first and second flaps.

31. Apparatus for forming envelopes on-line with a printing apparatus which prints text onto envelope forming sheets and sheets to be inserted into the envelopes comprising:

receiving means for receiving a once-folded envelope sheet having a length and a width and having been previously folded along its width to form first and second opposed flaps, each flap having a width equal to the width of the envelope sheet and having first and second ends respectively, located at opposite edges along the width of said envelope sheet;

means for pressing the first and second flaps together so that the first end of said first flap opposes the first end of said second flap and the second end of said first flap opposes the second end of said second flap; and means for applying adhesive tape over the first and second ends of the first and second flaps to secure the first end of the first flap to the first end of the second flap, and to secure the second end of the first flap to the second end of the second flap to form an envelope having an internal width at least the same as the width of the envelope sheet, said adhesive tape forming first and second opposite ends of said envelope.

32. The apparatus according to claim 31, wherein said means for pressing is a clamp which engages opposite ends of the once-folded envelope sheet.

33. The apparatus according to claim 32, wherein said clamp includes first and second pairs of jaws spaced apart from each other to selectively engage end portions of the once-folded envelope sheet.

34. The apparatus according to claim 31, further comprising:

means for placing a folded insert sheet between the first and second flaps prior to the flaps being pressed together by said means for pressing.

35. The apparatus according to claim 34, wherein the second flap has a length which is greater than a length of the first flap to form an extension which extends beyond the first flap; further comprising:

means for folding the extension over the first flap prior to applying the adhesive tape so that the adhesive tape also secures the extension to the first flap when applied by said means for applying, in addition to forming the first and second opposite ends of the envelope.

36. The apparatus according to claim 34, wherein the second flap has a length which is greater than a length of the first flap to form an extension which extends beyond the first flap; further comprising:

means for folding the extension over the flap after the adhesive tape is applied by said means for applying; and means for adhesively securing the extension to the first flap.

37. The apparatus according to claim 31, wherein said receiving means is a compiler tray having a registration gate movable therethrough to selectively engage and hold the once-folded envelope in place thereon.

38. The apparatus according to claim 31, wherein:

said printing apparatus feeds said insert sheets and said envelope sheets from a same sheet feeding tray of said printing apparatus, and thus said insert sheets and said envelope sheets have a same size; and said printing apparatus and said receiving means feed and receive, respectively, said envelope sheets and said insert sheets in a same orientation and without altering the size of said envelope sheets and said insert sheets.

* * * * *